(12) United States Patent
DeLisio (10) Patent No.: US 9,555,494 B2
(45) Date of Patent: Jan. 31, 2017

(54) SYSTEM AND METHOD FOR AUXILIARY POWER GENERATOR WITH SELECTABLE FREQUENCY

(71) Applicant: Lincoln Global, Inc., City of Industry, CA (US)

(72) Inventor: Carmen DeLisio, Mentor, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 871 days.

(21) Appl. No.: 13/787,981

(22) Filed: Mar. 7, 2013

(65) Prior Publication Data
US 2014/0246412 A1  Sep. 4, 2014

Related U.S. Application Data

(60) Provisional application No. 61/772,232, filed on Mar. 4, 2013.

(51) Int. Cl.
*B23K 9/10* (2006.01)

(52) U.S. Cl.
CPC ........... *B23K 9/1075* (2013.01); *B23K 9/1006* (2013.01)

(58) Field of Classification Search
CPC combination set(s) only.
See application file for complete search history.

(56) References Cited

U.S. PATENT DOCUMENTS

| | | | |
|---|---|---|---|
| 4,273,984 A | 6/1981 | Hara | |
| 4,554,430 A | 11/1985 | Belamaric | |
| 5,444,356 A | 8/1995 | Reynolds | |
| 6,144,190 A | 11/2000 | Scott | |
| 6,204,476 B1 | 3/2001 | Reynolds | |
| 6,281,664 B1 | 8/2001 | Nakamura | |
| 6,608,401 B1 | 8/2003 | Walter | |
| 7,211,764 B2 | 5/2007 | Leisner | |
| 7,235,759 B2 | 6/2007 | Geissler | |
| 7,422,452 B2 * | 9/2008 | Achtner | H01R 9/11 439/106 |
| 8,089,792 B2 | 1/2012 | Inagawa | |
| 8,115,328 B2 | 2/2012 | Fosbinder | |

(Continued)

FOREIGN PATENT DOCUMENTS

| | | |
|---|---|---|
| CN | 102208866 A | 10/2011 |
| CN | 202147087 U | 2/2012 |

(Continued)

OTHER PUBLICATIONS

International Line Voltage Standards, Controlled power company, 2005-2015.*

(Continued)

*Primary Examiner* — Quang D Thanh
*Assistant Examiner* — Renee Larose
(74) *Attorney, Agent, or Firm* — Brad C. Spencer (57) ABSTRACT

The invention described herein generally pertains to a system and method for a welder system that includes a weld power generator and an auxiliary power generator in which the auxiliary power generator is adjustable between a first frequency and a second frequency for a power output to at least one outlet. The first frequency can correspond with a first national standard for a first country and the second frequency can correspond with a second national standard for a second country.

17 Claims, 6 Drawing Sheets

(56) References Cited

U.S. PATENT DOCUMENTS

| | | | |
|---|---|---|---|
| 8,338,971 B2 | 12/2012 | Radtke | |
| 8,405,001 B2* | 3/2013 | Albrecht | B23K 9/1006 219/108 |
| 8,502,115 B2* | 8/2013 | DuVal | B23K 9/1068 219/133 |
| 8,704,130 B2 | 4/2014 | Luo | |
| 8,759,714 B2* | 6/2014 | Fosbinder | B23K 9/1006 219/130.21 |
| 8,791,388 B2* | 7/2014 | Albrecht | B23K 9/1006 219/133 |
| 8,841,583 B2* | 9/2014 | Albrecht | B23K 9/1006 219/130.1 |
| 2006/0157459 A1* | 7/2006 | Fosbinder | B23K 9/1006 219/130.21 |
| 2007/0215585 A1* | 9/2007 | O'Connor | B23K 9/1081 219/130.1 |
| 2008/0264915 A1 | 10/2008 | Manthe | |
| 2010/0187210 A1* | 7/2010 | Albrecht | B23K 9/1006 219/133 |
| 2010/0320183 A1* | 12/2010 | Borchert | B23K 9/1006 219/130.1 |
| 2011/0049115 A1* | 3/2011 | Luo | B23K 9/1056 219/130.21 |
| 2011/0114607 A1* | 5/2011 | Albrecht | B23K 9/1006 219/108 |
| 2012/0211472 A1* | 8/2012 | Farah | B23K 9/1012 219/108 |

FOREIGN PATENT DOCUMENTS

| | | |
|---|---|---|
| CN | 203086357 U | 7/2013 |
| WO | 03/090003 A1 | 10/2003 |
| WO | 2014/176036 A1 | 10/2014 |

OTHER PUBLICATIONS

"Trailblazer 325 EFI (Kohler) with Excel Power, GPCI", Miller Electric Mfg. Co., located on the Internet at: P:\Client-Work\LINC. w\55350.w\References\Trailblazer® 325 Engine-Driven Welder _ Miller - MillerWelds.html, retrieved on Feb. 1, 2016.

"DGK100D Owners Manual: Sound Attenuated Diesel Generator Sets", Shindaiwa Construction Products, Hiroshima, Japan, Apr. 2009.

* cited by examiner

SYSTEM AND METHOD FOR AUXILIARY POWER GENERATOR WITH SELECTABLE FREQUENCY

CROSS-REFERENCE TO RELATED APPLICATIONS

This application claims the benefit of priority to U.S. Provisional Application Ser. No. 61/772,232, filed Mar. 4, 2013, and entitled "SYSTEM AND METHOD FOR AUXILIARY POWER GENERATOR WITH SELECTABLE FREQUENCY." The entirety of the aforementioned application is incorporated herein by reference.

TECHNICAL FIELD

The invention described herein pertains generally to a system and method for a welder system that provides a portion of power at a first frequency or a second frequency via an auxiliary power generator.

BACKGROUND OF THE INVENTION

Welding systems reside at the core of the modern industrial age. From massive automobile assembly operations to automated manufacturing environments, these systems facilitate joining in ever more complicated manufacturing operations. Welding systems include an engine and a weld power generator to drive the welding process. Additionally, welding system often include an auxiliary power generator that generates power for additional devices external to the welding system. The auxiliary power generator can include one or more outlet plugs that enable physical coupling for powering of external devices. These external devices as well as the outlet plugs are regulated by national standards associated with voltage, current, and/or frequency. For instance, each country includes respective national standards for voltage, current, and/or frequency as well as the outlet plugs (e.g., female plugs) and corresponding male plugs.

As mentioned, welding systems can include an auxiliary power generator and what is needed is an improved technique related to auxiliary power generators.

SUMMARY OF THE INVENTION

In accordance with the present invention, there is provided a welder system with an auxiliary power generator that selects between a first frequency and a second frequency that comprises: an engine; a weld power generator that powers a welder for a welding process; an auxiliary power generator that creates a portion of output power; a frequency component that is configured to generate the portion of power at a first frequency or a second frequency; and a switch component that selects between the first frequency or the second frequency based on an input.

In accordance with the present invention, there is provided a welder system with an auxiliary power generator that comprises: an engine; a weld power generator that powers a welder for a welding process; an auxiliary power generator that creates a portion of output power; a switch component that selects between a first frequency or a second frequency based on an input; a first pulley system coupled to a first belt that drives the auxiliary power generator at the first frequency; a second pulley system coupled with a second belt that drives the auxiliary power generator at the second frequency; and a clutch coupled to the weld power generator that engages the first pulley system or the second pulley system based upon the selection of the first frequency or the second frequency via the switch component.

In accordance with the present invention, there is provided a welder system including an auxiliary power generator that comprises: an engine; a weld power generator that powers a welder for a welding process; an auxiliary power generator that creates a portion of output power; means for generating the portion of power at a first frequency or a second frequency; and means for selecting between the first frequency or the second frequency based on an input.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to methods and systems that generally relate to a welder system that includes a weld power generator and an auxiliary power generator in which the auxiliary power generator is adjustable between a first frequency and a second frequency for a power output to at least one outlet. The first frequency can correspond with a first national standard for a first country and the second frequency can correspond with a second national standard for a second country. By including a frequency component with the welder system to allow selection between two or more frequencies, the auxiliary power generator can generate power in accordance with more than one national standard. Additionally, the welder system can include outlet plugs associated with the respective national standard, wherein the power generated by the auxiliary power generator is transmitted via such outlet plugs. In another embodiment, the welder system includes an auxiliary power generator that can produce two or more frequencies based on a selection or signal.

Figure 1:
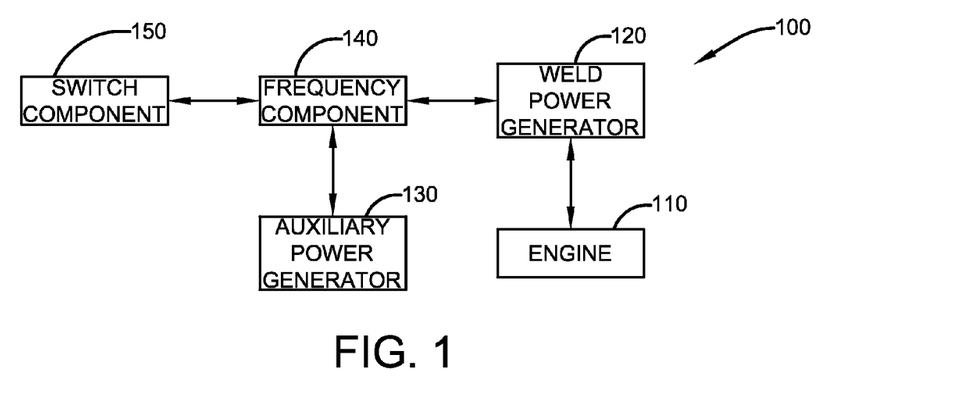
FIG. 1 is a block diagram illustrating a welder system that facilitates selecting a first frequency or a second frequency for a power output related to an auxiliary power generator.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIG. 1 illustrates welder system 100 that facilitates selecting a first frequency or a second frequency for a power output related to auxiliary power generator 130. Welder system 100 includes engine 110 that drives weld power generator 120 to provide power to at least a welder component associated with welder system 100. For instance, weld power generator 120 can be a one-to-one drive ratio with engine 110. Welder system 100 further includes auxiliary power generator 130 that supplies power to at least one external device upon connection to welder system 100 via a male and female connector (e.g., a male plug and female plug outlet, among others).

Conventional welder systems are specifically tailored to a single frequency or a single national standard associated with a voltage, current, and/or frequency. Thus, a welder system in one country may not be compatible or usable in another country due to varying standards for power output and/or connections (e.g., plugs, plug outlets, among others). Auxiliary power generator 130 is configured to output a portion of power at two or more frequencies in which the frequencies correspond to a particular national standard for a country. Moreover, welder system 100 includes one or more plug outlets (not shown but described in more detail in FIG. 2) that correspond to a national standard for connections and/or connectors (e.g., plugs, plug outlets, among others).

Welder system 100 includes frequency component 140 and switch component 150, wherein frequency component 140 is configured to generate a portion of power at a first frequency or a second frequency based on a selection from switch component 150. Specifically, auxiliary power generator 130 creates a portion of power in which such portion of power can be output at the first frequency or the second frequency via frequency component 140 and switch component 150. Switch component 150 is configured to allow a selection between two or more frequencies to output a portion of power from auxiliary power generator 130. In an embodiment, switch component 150 can be a toggle switch, a digital switch, an input from a user, a keyboard, a touch-screen, a digital signal, a suitable input for a frequency in which frequency component 140 utilizes to output, among others. Furthermore, as will be described in more detail below, it is to be appreciated that welder system 100 can adjust to two or more frequencies utilizing frequency component 140, wherein frequency component 140 is at least one of a portion of software, a portion of hardware, a portion of circuitry, a portion of analog circuits, a portion of digital circuits, or a combination thereof.

The portion of power from auxiliary power generator 130 can drive one or more external devices, wherein an external device is one not contained within the welder system 100 and/or is connected via an electrical connector (e.g., cord, among others), plugs, and/or outlet plugs.

In an embodiment, a component (e.g., frequency component 140, switch component 150, among others) can be a portion of hardware, a portion of software, or a combination thereof. In one embodiment, frequency component 140 is a computer operable to execute the disclosed methodologies and processes, including methods 600 and 700 described herein. In order to provide additional context for various aspects of the present invention, the following discussion is intended to provide a brief, general description of a suitable computing environment in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with frequency component 140.

The frequency component 140 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit. The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within frequency component 140, such as during start-up, is stored in the ROM.

Frequency component 140 can further include a hard disk drive, a magnetic disk drive, e.g., to read from or write to a removable disk, and an optical disk drive, e.g., for reading a CD-ROM disk or to read from or write to other optical media. Frequency component 140 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by frequency component 140.

Figure 2:
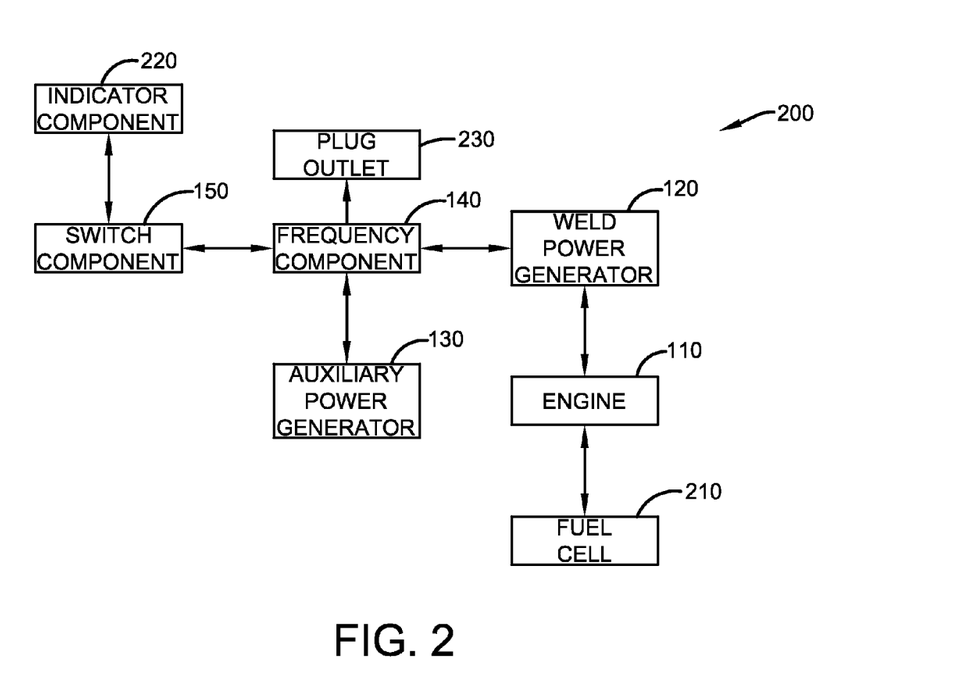
FIG. 2 is a block diagram illustrating a welder system that provides adjustable frequency for an auxiliary power generator.

FIG. 2 illustrates welder system 200 that provides adjustable frequency for an auxiliary power generator. Welder system 200 includes engine 110 that drives weld generator 120 in which fuel cell 210 provides a source of fuel for engine 110. It is to be appreciated that fuel cell 210 can be a suitable source of fuel such as, but not limited to, diesel fuel, gasoline, fuel reservoir, fuel bladder, fuel tank, among others. For instance, fuel cell 210 can be located on a base of welder system 200 in which fuel cell is 210 is underneath a portion of at least one of engine 110, weld power generator 130, auxiliary power generator 130, frequency component 140, and/or a combination thereof. Welder system 200 further includes auxiliary power generator 130 that provides a portion of power to a device external to welder system 200. In another embodiment, auxiliary power generator 130 generates a portion of power for a device internal and/or external to welder system 200.

Figure 5:
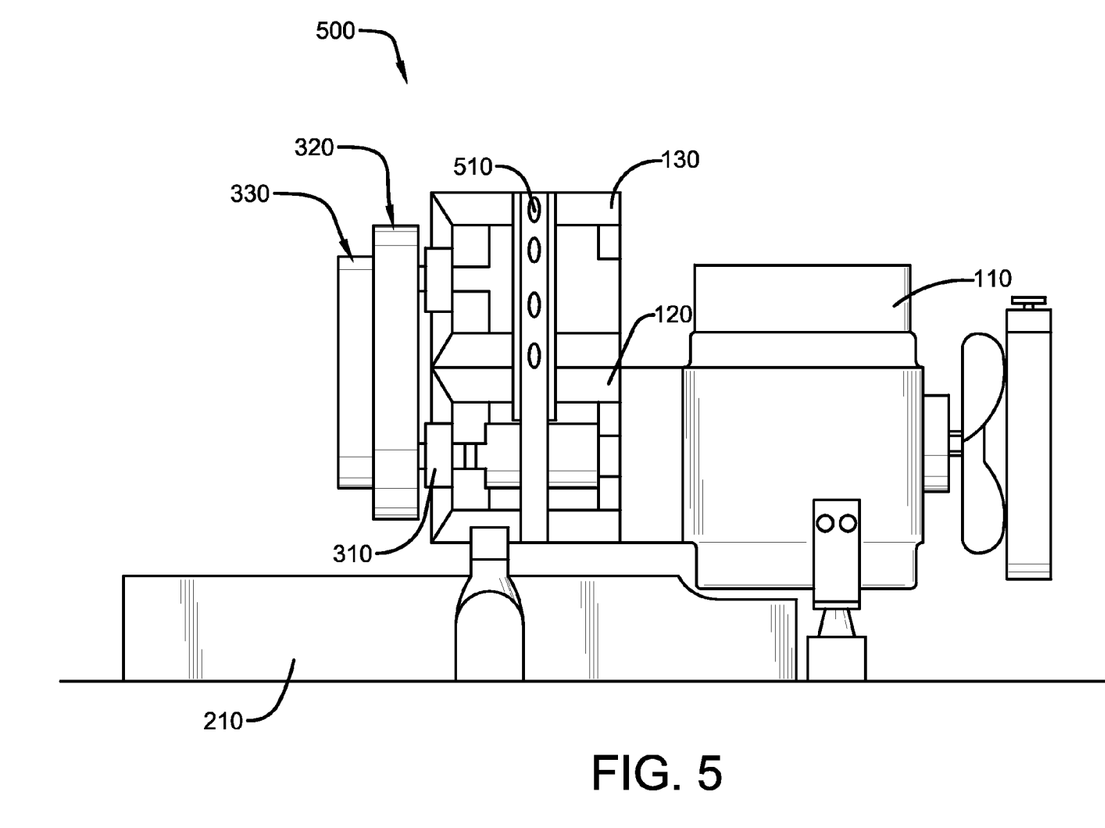
FIG. 5 is a block diagram illustrating a welder system with a magnetic clutch mechanism that provides selection between a first frequency and a second frequency for a power output of an auxiliary power generator.

Auxiliary power generator 130 is driven by weld power generator 120 via a coupling (e.g., mechanical coupling, physical coupling, electrical coupling, among others) in which auxiliary power generator 130 is physically mounted proximate to weld power generator 120. For instance, auxiliary power generator 130 can be mounted above or below (e.g., vertical stack orientation) weld power generator 120 (See FIG. 5 illustrating an above weld power generator 120 configuration) in which a drive shaft of auxiliary power generator 130 is parallel with a drive shaft of weld power generator 120 in separate horizontal planes. For instance, auxiliary power generator 130 can be on top of weld power generator 120, below weld power generator 210, in a physical position in which respective drive shafts of weld power generator 120 and auxiliary power generator 130 are in separate horizontal planes, among others. In another example, auxiliary power generator 130 can be mounted in a substantially same plane as weld power generator 120 (e.g., horizontal stack orientation). For instance, auxiliary power generator 130 can be located in front of weld power generator 120, behind weld power generator 120, in a physical position in which a driveshaft of weld power generator 120 is aligned (e.g., horizontally, in the substantially same plane, sharing one or more drive shafts between weld power generator and auxiliary power generator, etc.) with a drive shaft of auxiliary power generator 130, among others. In an embodiment, auxiliary generator 130 can be driven by a Power Take Off (PTO) that can be located in a rear of a flywheel and in front of a crankshaft.

Frequency component 140 is configured to convert and/or generate a portion of power at two or more frequencies in which the portion of power is generated by auxiliary power generator 130, wherein the two or more frequencies are determined by switch component 150. It is to be appreciated and understood that frequency component 140 can include at least one of a portion of physical electrical components, a portion of hardware, a portion of software, or a combination thereof to convert a portion of power to a particular frequency and/or generate a portion of power at a particular frequency. Still, other means for converting and/or generating a portion of power into a selected frequency may be employed with sound engineering judgment. In an embodiment, frequency component 140 converts a portion of power to at least one of 50 Hertz (Hz) or 60 Hz. In an embodiment, frequency component 140 generates a portion of power at one of 50 Hertz (Hz) or 60 Hz. Switch component 150 is configured to enable a selection between two or more frequencies. Moreover, indicator component 220 is configured to provide visual, audible, and/or haptic feedback (e.g., tactile feedback, among others) to indicate a selection of two or more frequencies. In an embodiment, a user can select between two or more frequencies in which frequency component converts a portion of power thereto and/or generates a portion of power at the selected frequency. In another embodiment, switch component 150 detects a connected device (e.g., external, for instance) via a male plug (e.g., connected to plug outlet 230) or a power demand from such device and selects a frequency based on such detection. For instance, welder system 200 includes one or more plug outlets 230 with one or more female receptacles that receive and physically couple to a male plug, wherein the one or more female receptacles or male plugs are configured to a national standard (e.g., defining shape of prongs, defining number of prongs, power ratings, current, voltage, etc.). System 200 can include two or more sets of plug outlets 230 that are configured with two or more national standards for respective. Thus, switch component 150 can be configured to detect an external device connected to a set of plug outlets 230 and detect a frequency based thereon.

Figure 3:
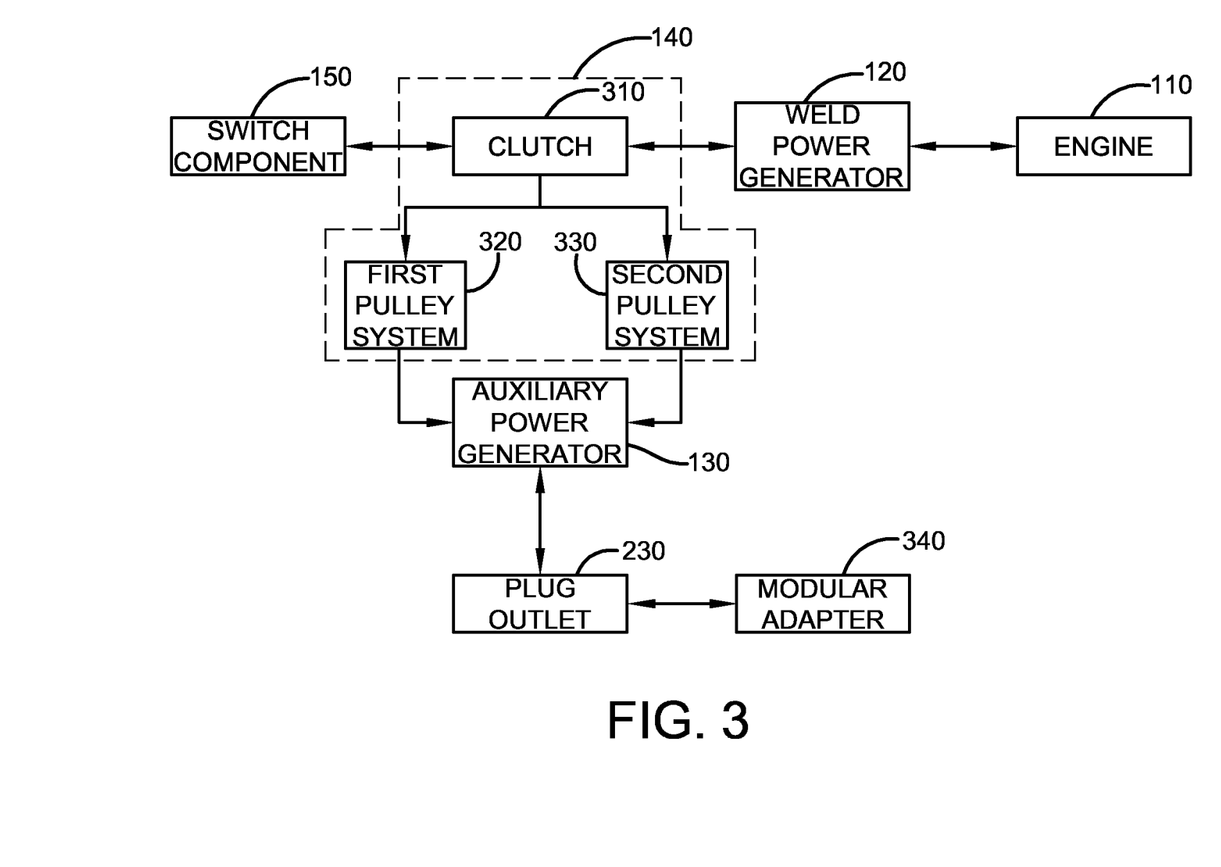
FIG. 3 is a block diagram illustrating a welder system with a clutch that enables selectable frequency for power output of an auxiliary power generator.

FIG. 3 illustrates welder system 300 with a clutch that enables selectable frequency for power output of an auxiliary power generator. Welder system 300 illustrates frequency component 140 as system of mechanical components, mechanisms, or devices. In an embodiment, system 300 includes a clutch mechanism to implement a change of frequencies as well as a pulley system. Still, other mechanical means for converting a portion of power into a selected frequency and/or generating a portion of power at a selected frequency may be employed with sound engineering judgment. Welder system 300 includes clutch 310 that is configured to drive first pulley system 320 or second pulley system 330, wherein a pulley system can correspond to a particular frequency. For instance, clutch 310 can be a magnetic clutch that engages and/or disengages a system (e.g., pulley system, among others) used to generate or convert a portion of power from auxiliary power supply 130 into a selected frequency. It is to be appreciated that although two pulley systems and/or one clutch are illustrated in FIG. 3, any suitable number pulley systems and/or clutches can be implemented in which a pulley system corresponds to a frequency and a clutch selects a pulley system in order to output a portion of power at such frequency.

In an embodiment, a 50 Hz frequency power output can be generated by a first pulley system and a 60 Hz frequency power output can be generated by a second pulley system. Based on a selection between the 50 Hz frequency or the 60 Hz frequency, a clutch can drive one of the pulley systems to engage such pulley system with the auxiliary power generator of a welder system such that the output power for the auxiliary power is the selected frequency. In another embodiment, a first frequency can correspond to a first national standard (e.g., regulating at least one of a frequency, a voltage, or a current reading or level) and a second frequency can correspond to a second national standard (e.g., regulating at least one of a frequency, a voltage, or a current reading or level). It is to be appreciated that two or more frequencies that correspond respectively to two or more national standards can be employed with the subject innovation. For instance, a national standard can be based upon a standard for The United States of America, Europe, among others. Based on a selection (e.g., user selected, detected based on connected device, among others), a portion of power with auxiliary power generator 130 can be output with the first frequency or the second frequency within welder system 300.

Welder system 300 further includes modular adapter 340 that is a device that physically connects to a plug outlet (e.g., female receptacle) configured for a first national standard in order to adapt the plug outlet to a disparate national standard. For instance, modular adapter 340 can include a male portion that connects to a plug outlet associated with welder system 300 and a female portion that receives a male plug, wherein the male portion and the plug outlet (e.g., female receptacle) corresponds to a first national standard and the female portion of the modular adapter corresponds to a second national standard. In an embodiment, the modular adapter and/or the plug outlet transmit one of a first frequency or a second frequency to a device external to the welder system or a welder associated with the welder system. Moreover, it is to be appreciated that welder system 300 can include a plurality of modular adapters, plug outlets, frequencies, among others in which each correspond to a national standard for a geographic location.

Figure 4:
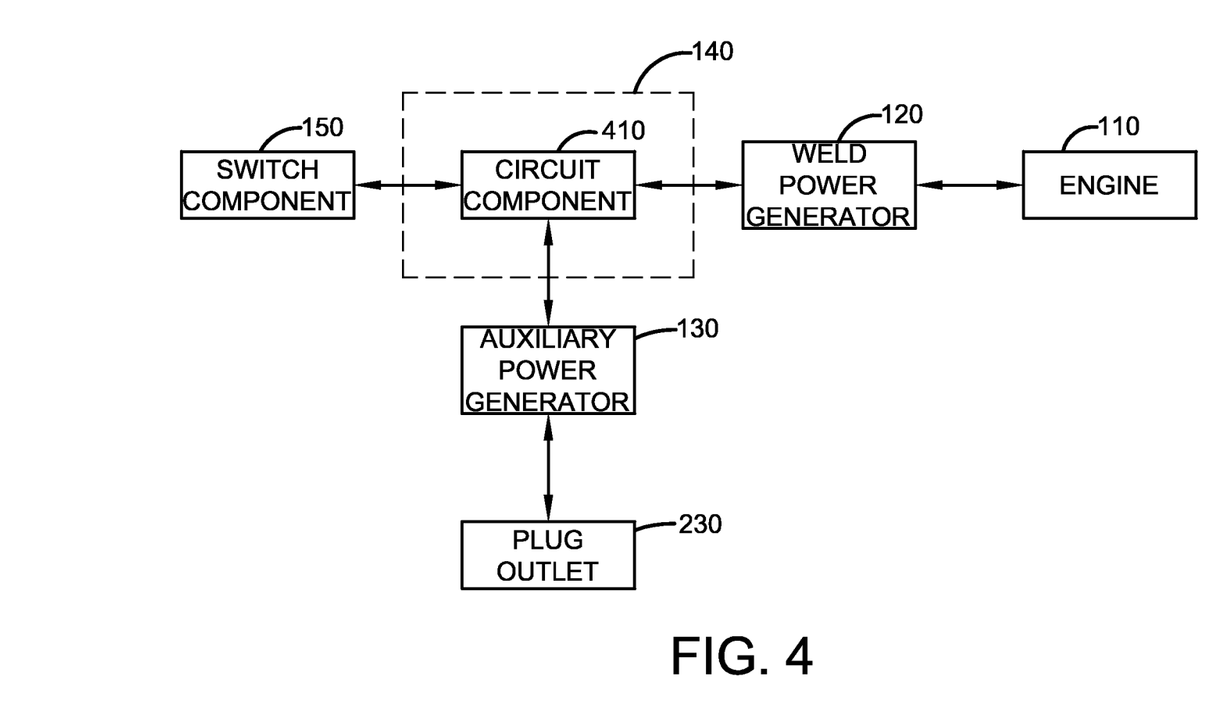
FIG. 4 is a block diagram illustrating a welder system with a circuit component that enables selectable frequency for power output of an auxiliary power generator.

FIG. 4 illustrates welder system 400 with a circuit component that enables selectable frequency for power output of an auxiliary power generator. Welder system 400 illustrates frequency component 140 depicted as circuit component 410. Although a single circuit component 410 is depicted in FIG. 4, it is to be appreciated that any suitable number of circuit components can be utilized to convert a portion of power generated by auxiliary power generator 130 into two or more frequencies based on a selected frequency. For instance, circuit component 410 can include one or more electronic components, electronic devices, switches, diodes, operative amplifiers, and the like to convert a portion of power from a first frequency into a second frequency.

FIG. 5 illustrates welder system 500 with a magnetic clutch mechanism that provides selection between a first frequency and a second frequency for a power output of an auxiliary power generator. System 500 is a portion of a welder system that includes engine 110 that drives weld power generator 120 to generate a portion of power for a welder. System 500 further includes fuel cell 210 that fuels engine 110. As discussed above, fuel cell 210 can be displaced on a base of the welder system and/or underneath a portion of weld power generator 120, engine 110, auxiliary power generator 130, among others. System 500 depicts auxiliary power generator 130 in a vertical stack orientation in which a drive shaft of auxiliary power generator 130 is located in a parallel plane of a drive shaft of weld power generator 120. In an embodiment, auxiliary power generator 130 is coupled or mounted to weld power generator 120 via channel mounting 510 (e.g., rigid channel mounting, rigid "C" channel mounting, among others). Although not illustrated, a horizontal stack orientation can be implemented in which a drive shaft of auxiliary power generator 130 is located in substantially the same plane of a drive shaft of weld power generator 120. For instance, a horizontal stack orientation allows auxiliary power generator 130 and weld power generator 120 and/or engine 110 to share one or more drive shafts. For instance, in a horizontal configuration at least one of a transmission can be employed or a gearbox (e.g., planetary) can be employed in order to increase or reduce RPM.

System 500 further includes first pulley system 320 and second pulley system 330 in which clutch 310 engages and/or disengages based on a selected frequency. As discussed above, each pulley system can relate to a particular frequency and upon selection, clutch 310 engages such pulley system. Clutch 310 can be any suitable clutch that engages and/or disengages first pulley system 320 or second pulley system 330 such as, but not limited to, a magnetic clutch, among others.

Figure 6:
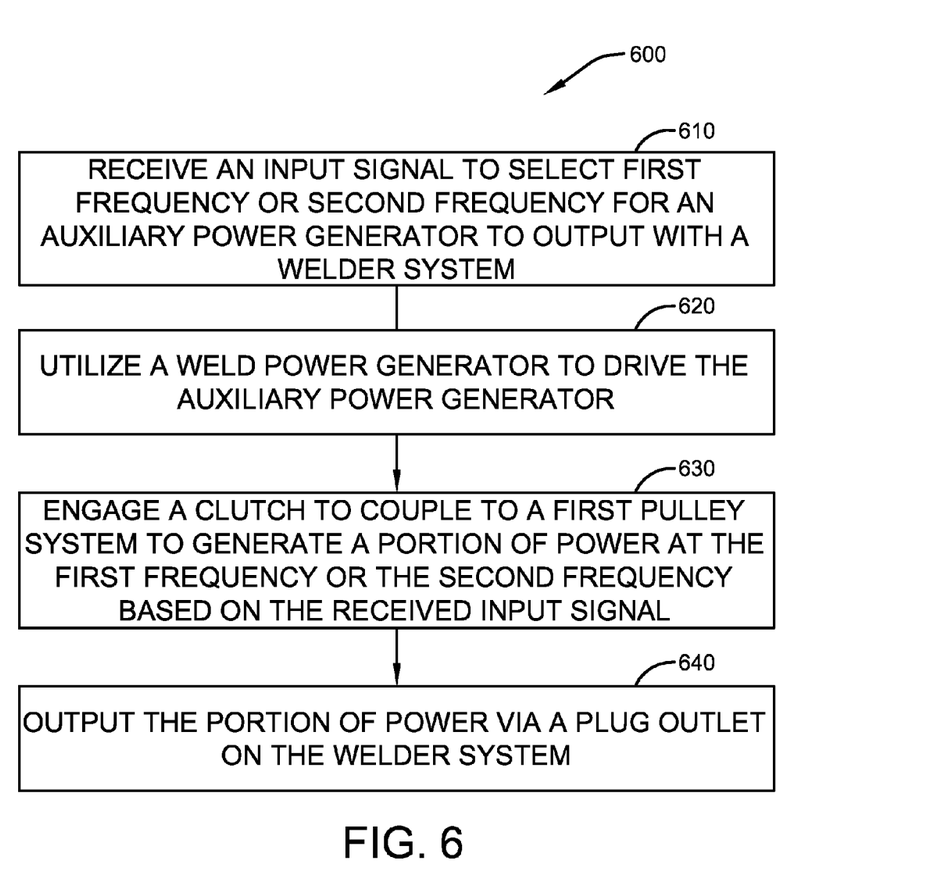
FIG. 6 is a flow diagram of selection between a first frequency or a second frequency for power output of an auxiliary power generator of welder system.
Figure 7:
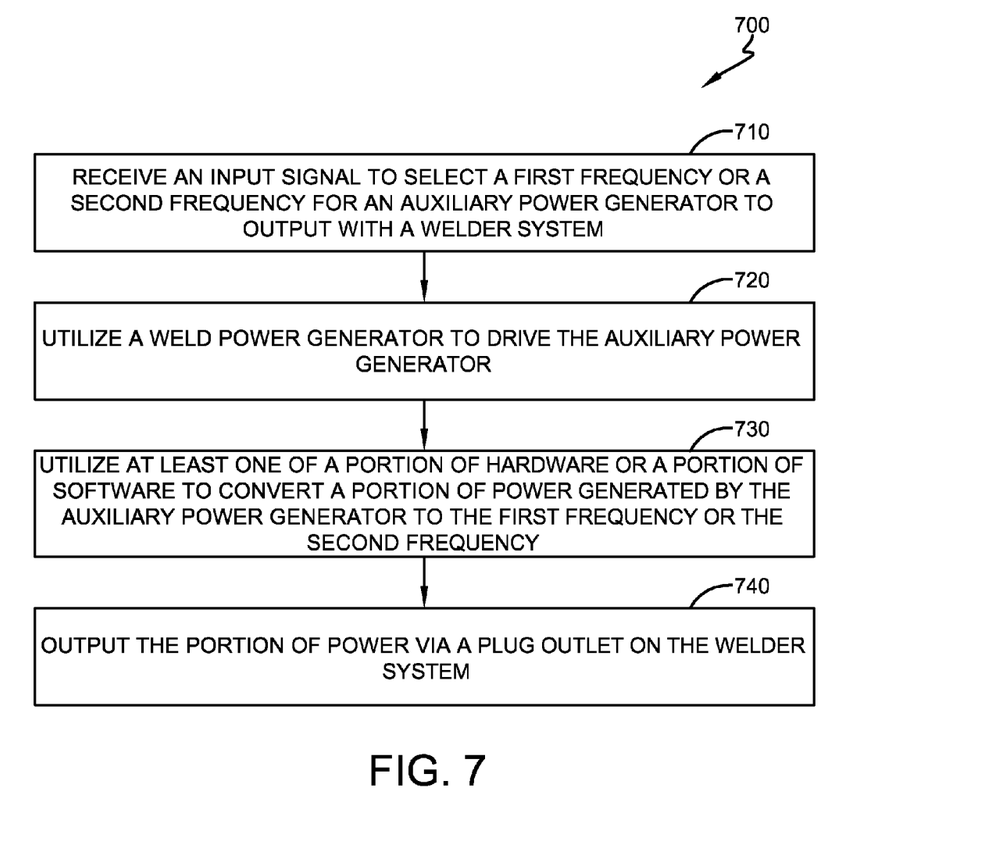
FIG. 7 is a flow diagram of selection between a first frequency or a second frequency for power output of an auxiliary power generator of welder system.

In view of the exemplary devices and elements described supra, methodologies that may be implemented in accordance with the disclosed subject matter will be better appreciated with reference to the flow charts and/or methodologies of FIGS. 6 and 7. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

It is to be appreciated that a component can be, but is not limited to, a portion of software, a portion of hardware, or a combination thereof. Systems and/or methods described herein can include at least one component, wherein a component includes at least one processor coupled to a portion of memory. Memory can store at least one instruction that can be executed by at least one processor.

Sequentially, the following occurs as illustrated in the decision tree flow diagram 600 of FIG. 6 which is a flow diagram 600 that provides selection between a first frequency or a second frequency for power output of an auxiliary power generator of welder system. An input signal is received to select a first frequency or a second frequency for an auxiliary power generator to output with a welder system (reference block 610). A weld power generator is utilized to drive the auxiliary power generator (reference block 620). A clutch is engaged to couple to a first pulley system to generate a portion of power at the first frequency or the second frequency based on the received input signal (reference block 630). The portion of power is output via a plug outlet on the welder system (reference block 640).

The following occurs as illustrated in the flow diagram 700 of FIG. 7 that provides selection between a first frequency or a second frequency for power output of an auxiliary power generator of welder system. An input signal is received to select a first frequency or a second frequency for an auxiliary power generator to output with a welder system (reference block 710). A weld power generator is utilized to drive the auxiliary power generator (reference block 720). At least one of a portion of hardware or a portion of software is utilized to convert a portion of power generated by the auxiliary power generator to the first frequency or the second frequency (reference block 730). The portion of power is output via a plug outlet on the welder system (reference block 740).

In an embodiment, method 600 and/or method 700 includes affixing the auxiliary power generator to a top portion of the weld power generator in a vertically stacked orientation. Method 600 and/or method 700 includes affixing the auxiliary power generator to a bottom portion of the weld power generator in a vertically stacked orientation. In an embodiment, method 600 and/or method 700 includes connecting a fuel cell to an engine that drives the weld power generator. In another embodiment, method 600 and/or method 700 includes locating the fuel cell on a base of the welder system underneath a portion of the engine, the weld power generator, or the auxiliary power generator.

In an embodiment, the first frequency is 50 Hertz (Hz) and the second frequency is 60 Hz. In another embodiment, the auxiliary power generator can select between two or more frequencies. In another embodiment, the weld power generator is a one-to-one drive ratio with the engine. In another embodiment, the portion of output power drives a device external to the welder. In another embodiment, a first plug outlet is configured for the first frequency that transmits the first frequency for the portion of power to a device external to the welder. In another embodiment, a modular adapter connects a male plug to the first plug outlet in which the modular adapter and the first plug outlet transmits the second frequency to a device external to the welder. In another embodiment, a second plug outlet is configured for the second frequency that transmits the second frequency for the portion of power to a device external to the welder. In another embodiment, a modular adapter connects a male plug to the second plug outlet in which the modular adapter and the second plug outlet transmits the first frequency to a device external to the welder. In another embodiment, at least one plug outlet is configured to transmit a portion of power at the first frequency and at least one plug outlet configured to transmit a portion of power at the second frequency.

In an embodiment, the frequency component is one or more circuit components that convert power generated by the auxiliary power generator to the first frequency or the second frequency based upon the switch component. In another embodiment, the frequency component includes the following a first pulley system coupled to a first belt that drives the auxiliary power generator at the first frequency; a second pulley system coupled with a second belt that drives the auxiliary power generator at the second frequency; and a magnetic clutch coupled to the weld power generator that engages the first pulley system or the second pulley system based upon the selection of the first frequency or the second frequency via the switch component.

In another embodiment, the welder system includes a fuel cell that supplies a portion of fuel to the engine in which the fuel cell is displaced over an area at a base of the welder system and underneath at least a portion of at least one of the engine, the weld power generator, or the auxiliary power generator. In another embodiment, the auxiliary power generator is mounted in a vertical stack orientation with the weld power generator, wherein a location for the mount is at least one above the weld power generator or below the weld power generator. In another embodiment, the first frequency is a frequency corresponding to a national standard for at least one of a voltage, a current, or a frequency in a first country and the second is a frequency corresponding to a national standard for at least one of a voltage, a current, or a frequency in a second country. In another embodiment, the first country is the United States of America and the national standard includes a 60 Hz frequency. In another embodiment, the auxiliary power generator is attached to a top portion of the weld power generator in a vertically stacked orientation. In another embodiment, the auxiliary power generator is attached to a bottom portion of the weld power generator in a vertically stacked orientation.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welder system, comprising:
an engine;
a weld power generator that powers a welder for a welding process;
an auxiliary power generator that creates a portion of output power, wherein the auxiliary power generator is driven by the weld power generator via a mechanical coupling;
a frequency component that is configured to generate the portion of power at a first frequency or a second frequency, wherein the frequency component comprises,
a first pulley system coupled to a first belt that drives the auxiliary power generator at the first frequency;
a second pulley system coupled with a second belt that drives the auxiliary power generator at the second frequency;
a switch component that selects between the first frequency or the second frequency based on an input; and
a plug outlet operatively coupled to the auxiliary power generator, wherein the switch component is configured to detect a connected device connected to the plug outlet and automatically select one of the first frequency and the second frequency based on detecting the connected device.

2. The welder system of claim 1, wherein the first frequency is 50 Hertz (Hz) and the second frequency is 60 Hz.

3. The welder system of claim 1, wherein the weld power generator is in a one-to-one drive ratio with the engine.

4. The welder system of claim 1, wherein the connected device is external to the welder.

5. The welder system of claim 1, wherein the plug outlet includes a first plug outlet configured for the first frequency, and a second plug outlet configured for the second frequency.

6. The welder system of claim 1, further comprising a modular adapter that connects a male plug to the plug outlet.

7. The welder system of claim 1, wherein the plug outlet includes a first plug outlet configured to transmit a portion of power at the first frequency and a second plug outlet configured to transmit a portion of power at the second frequency.

8. The welder system of claim 1, wherein the frequency component further comprises:
a magnetic clutch coupled to the weld power generator that selectively engages one of the first pulley system and the second pulley system based upon the selection of the first frequency or the second frequency via the switch component.

9. The welder system of claim 1, further comprising a fuel cell that supplies a portion of fuel to the engine in which the fuel cell is displaced over an area at a base of the welder system and underneath at least a portion of the engine, the weld power generator, and the auxiliary power generator.

10. The welder system of claim 1, wherein the auxiliary power generator is mounted in a vertical stack orientation with the weld power generator, wherein a location for the mount is at least one above the weld power generator or below the weld power generator.

11. A welder system, comprising:
an engine;
a weld power generator that powers a welder for a welding process;
an auxiliary power generator that creates a portion of output power, wherein the auxiliary power generator is driven by the weld power generator via a mechanical coupling;
a switch component that selects between a first frequency or a second frequency based on an input;
a first pulley system coupled to a first belt that drives the auxiliary power generator at the first frequency;
a second pulley system coupled with a second belt that drives the auxiliary power generator at the second frequency; and
a clutch coupled to the weld power generator that selectively engages one of the first pulley system and the second pulley system based upon the selection of the first frequency or the second frequency via the switch component.

12. The welder system of claim 11, wherein the first frequency is 60 (Hertz) Hz and the second frequency is 50 Hz.

13. The welder system of claim 11, wherein the first frequency is a frequency corresponding to a national standard for at least one of a voltage, a current, or a frequency in a first country and the second is a frequency corresponding to a national standard for at least one of a voltage, a current, or a frequency in a second country.

14. The welder system of claim 13, wherein the first country is the United States of America and the national standard includes a 60 Hz frequency.

15. The welder system of claim 11, wherein the auxiliary power generator is attached to a top portion of the weld power generator in a vertically stacked orientation.

16. The welder system of claim 11, wherein the auxiliary power generator is attached to a bottom portion of the weld power generator in a vertically stacked orientation.

17. The welder system of claim 11, further comprising a plug outlet operatively coupled to the auxiliary power generator, wherein the switch component is configured to detect a connected device connected to the plug outlet and automatically select one of the first frequency and the second frequency based on detecting the connected device.

* * * * *